(12) United States Patent
Hirasawa

(10) Patent No.: US 11,644,659 B2
(45) Date of Patent: May 9, 2023

(54) OPTICAL APPARATUS

(71) Applicant: CANON KABUSHIKI KAISHA, Tokyo (JP)

(72) Inventor: Takami Hirasawa, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 60 days.

(21) Appl. No.: 16/881,078

(22) Filed: May 22, 2020

(65) Prior Publication Data

US 2020/0379245 A1  Dec. 3, 2020

(30) Foreign Application Priority Data

May 28, 2019  (JP) .............................. JP2019-099003

(51) Int. Cl.
 *G02B 23/18* (2006.01)
 *G02B 7/06* (2021.01)
 *G02B 27/64* (2006.01)

(52) U.S. Cl.
 CPC .............. *G02B 23/18* (2013.01); *G02B 7/06* (2013.01); *G02B 27/646* (2013.01)

(58) Field of Classification Search
 CPC ............................... G02B 23/18; G02B 23/646
 See application file for complete search history.

(56) References Cited

U.S. PATENT DOCUMENTS

| | | | | |
|---|---|---|---|---|
| 5,672,862 A * | 9/1997 | Ohara | ................... | G02B 27/646 359/557 |
| 6,208,464 B1 * | 3/2001 | Tsukamoto | .......... | G02B 27/646 359/557 |
| 6,226,123 B1 * | 5/2001 | Kanai | ................... | G02B 27/646 359/557 |
| 6,456,790 B2 * | 9/2002 | Sasaki | ...................... | G03B 5/00 396/55 |

(Continued)

FOREIGN PATENT DOCUMENTS

| | | | | |
|---|---|---|---|---|
| CN | 1365015 A | * | 8/2002 | ............. G02B 23/18 |
| JP | H10301034 A | | 11/1998 | |

(Continued)

OTHER PUBLICATIONS

Office Action issued in Japanese Appln. No. 2019-099003 dated Nov. 29, 2022. English translation provided.

*Primary Examiner* — Christopher Stanford
(74) *Attorney, Agent, or Firm* — Rossi, Kimms & McDowell LLP

(57) ABSTRACT

An optical apparatus includes a pair of first driving force generators that generates a driving force to the movable member in a first direction orthogonal to optical axes of a pair of objective optical systems, and a second driving force generator that generates a driving force to the movable member in a second direction orthogonal to the optical axes of the pair of objective optical systems and the first direction. The pair of first driving force generators are provided between a first line segment passing through the optical axes (Continued)

of the pair of objective optical systems and a second line segment passing through the optical axes of the pair of eyepiece optical systems or on at least one line segment of the first line segment and the second line segment. The second driving force generator is provided between the pair of image stabilization optical systems.

6 Claims, 3 Drawing Sheets

(56) References Cited

U.S. PATENT DOCUMENTS

| | | | |
|---|---|---|---|
| 7,783,179 B2 * | 8/2010 | Takahashi | G03B 5/00 |
| | | | 348/208.7 |
| 8,787,746 B2 * | 7/2014 | Yasuda | G02B 27/646 |
| | | | 396/55 |
| 8,922,891 B2 * | 12/2014 | Noguchi | G02B 27/646 |
| | | | 359/557 |
| 9,057,883 B2 * | 6/2015 | Yasuda | G02B 27/646 |
| 9,104,021 B2 * | 8/2015 | Noguchi | G02B 27/646 |
| 9,417,458 B2 | 8/2016 | Ando | |

FOREIGN PATENT DOCUMENTS

| | | | | |
|---|---|---|---|---|
| JP | H10319460 A | * | 12/1998 | |
| JP | 2000105343 A | * | 4/2000 | G02B 23/18 |
| JP | 2003222921 A | | 8/2003 | |
| JP | 2010097001 A | | 4/2010 | |
| JP | 2015143728 A | | 8/2015 | |
| JP | 2016029403 A | | 3/2016 | |

* cited by examiner

OPTICAL APPARATUS

BACKGROUND OF THE INVENTION

Field of the Invention

The present invention relates to an optical apparatus.

Description of the Related Art

Optical apparatuses, such as binoculars and a camera, with an image stabilizing function have conventionally been known in order to reduce image blurs caused by manual shakes and to improve the user-friendliness. The image stabilizing function of the binoculars using the lens shift method is realized by shifting a pair of image stabilization lenses forming part of a pair of optical systems in a direction that cancels the image blurs caused by the shakes of the binoculars among directions (pitch direction and yaw direction) orthogonal to the optical axis. Since optical images formed by the pair of optical systems are observed simultaneously by both eyes in the binoculars, the pair of image stabilization lenses are coupled to each other, and a pair of pitch and yaw actuators are disposed on the external shape sides of the pair of image stabilization lenses. Thereby, the pair of image stabilization lenses are simultaneously and similarly shifted. Japanese Patent Laid-Open No. ("JP") 2016-29403 discloses an optical apparatus having one actuator disposed between a pair of image stabilization lenses.

However, the optical apparatus disclosed in JP 2016-29403 disposes the other actuator on the external shape side, and the entire apparatus may become larger.

SUMMARY OF THE INVENTION

The present invention provides a compact optical apparatus.

An optical apparatus according to one aspect of the present invention includes a pair of objective optical systems which light from an observed object enters, a pair of eyepiece optical systems having optical axes decentered from optical axes of the pair of objective optical systems, an image stabilization base member provided between the pair of objective optical systems and the pair of eyepiece optical systems, a pair of image stabilization optical systems, a movable member configured to hold the pair of image stabilization optical systems and to move relative to the image stabilization base member, a pair of first driving force generators configured to generate a driving force to the movable member in a first direction orthogonal to the optical axes of the pair of objective optical systems, and a second driving force generator configured to generate a driving force to the movable member in a second direction orthogonal to the optical axes of the pair of objective optical systems and the first direction. The pair of first driving force generators are provided between a first line segment connecting the optical axes of the pair of objective optical systems and a second line segment connecting the optical axes of the pair of eyepiece optical systems or on at least one line segment of the first line segment and the second line segment. The second driving force generator is provided between the pair of image stabilization optical systems.

Further features of the present invention will become apparent from the following description of exemplary embodiments with reference to the attached drawings.

DESCRIPTION OF THE EMBODIMENTS

Figure 1:
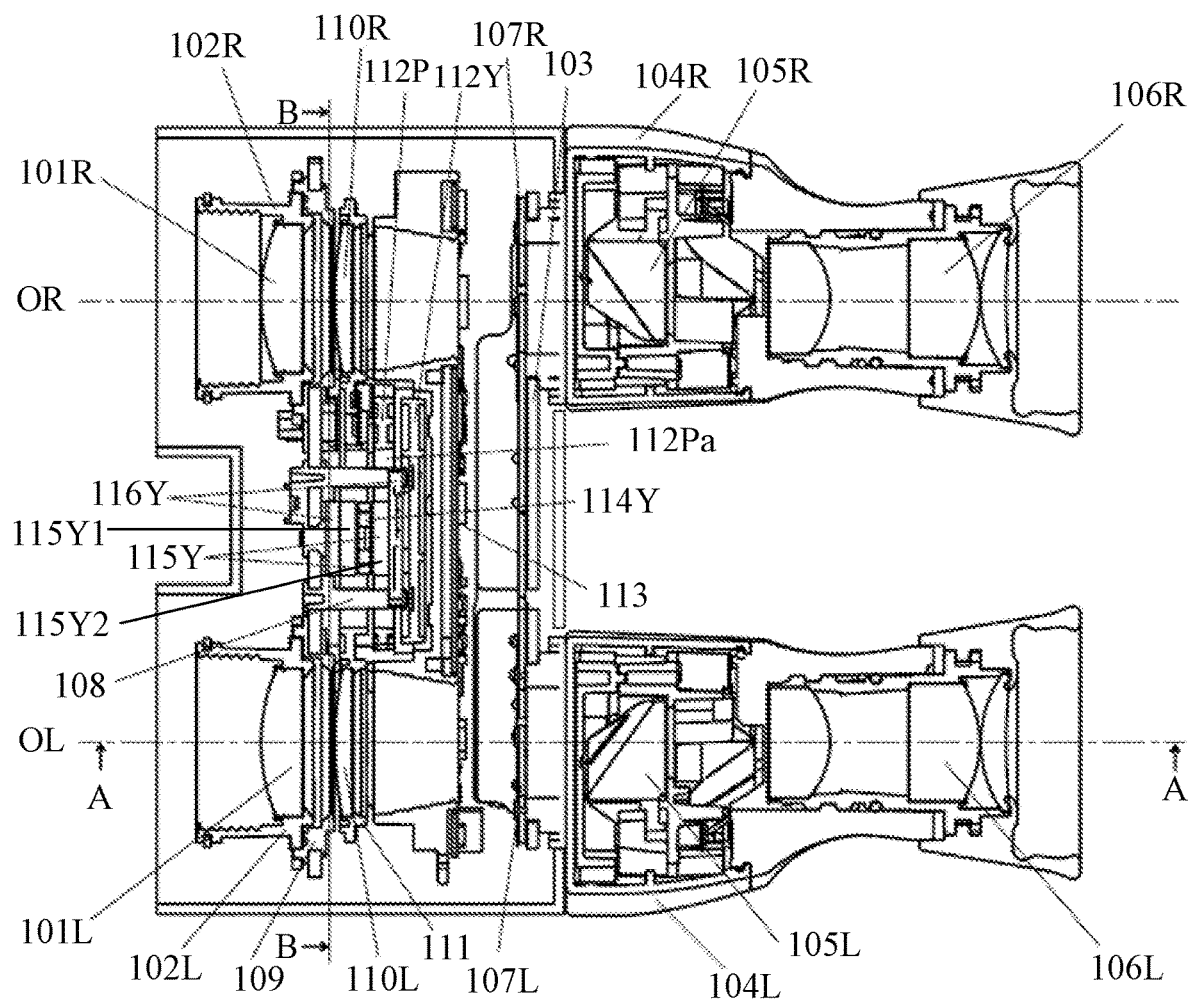
FIG. 1 is a top sectional view of binoculars according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

Figure 2:
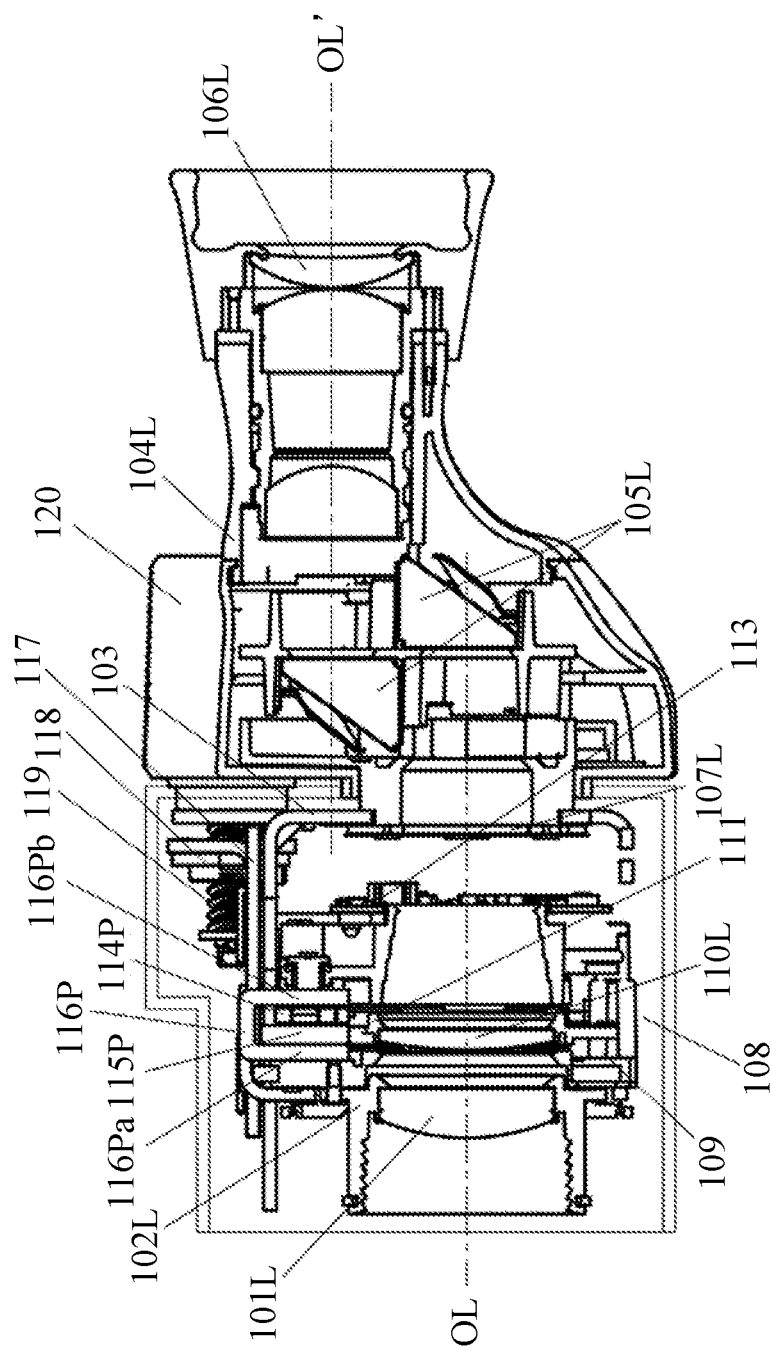
FIG. 2 is a sectional view taken along a line A-A in FIG. 1.
Figure 3:
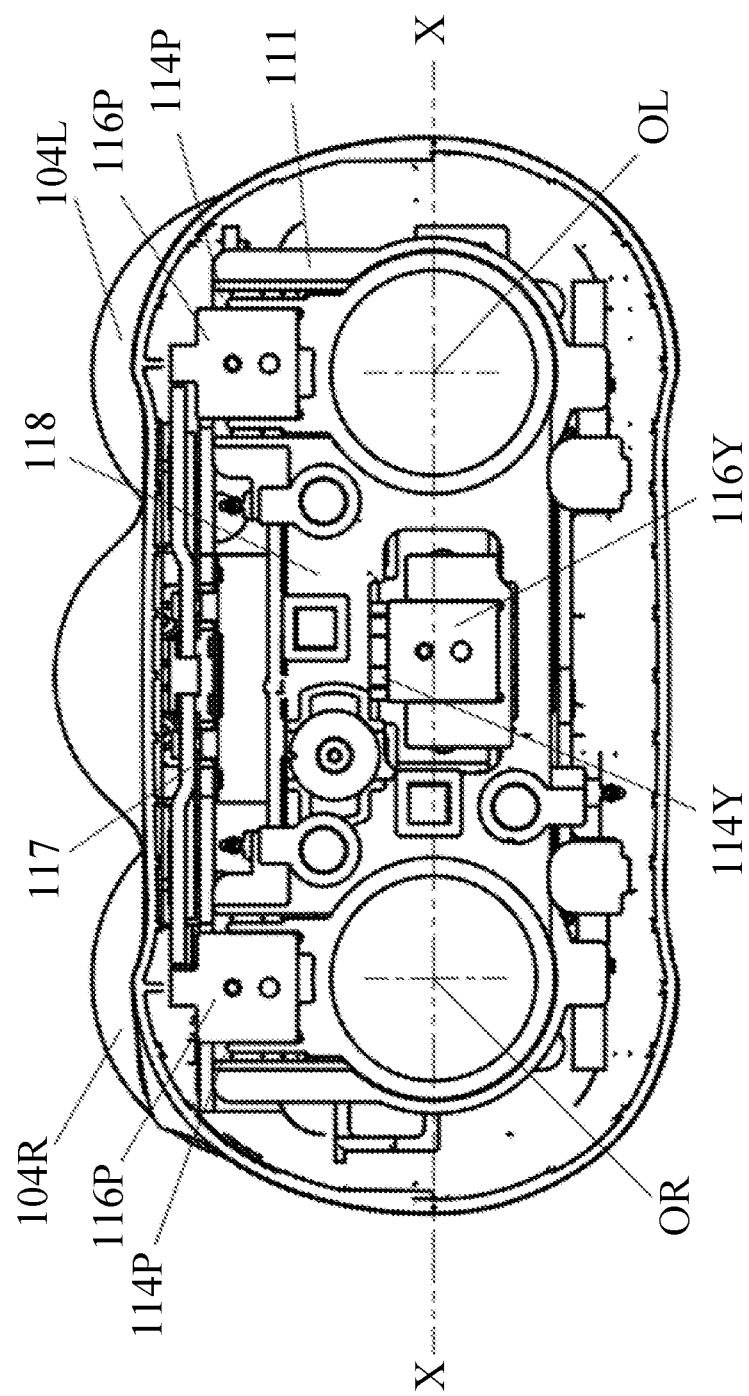
FIG. 3 is a sectional view of principal part taken along a line B-B in FIG. 1.

FIG. 1 is a top sectional view of binoculars (optical apparatus) 1 according to one embodiment of the present invention. FIG. 2 is a sectional view taken along a line A-A in FIG. 1. FIG. 3 is a sectional view of principal part taken along a line B-B in FIG. 1.

The binoculars 1 include objective units 102L and 102R that hold a pair of left and right objective optical systems 101L and 101R that receive light from an observed object, a base member 103 that holds them, and eyepiece units 104L and 104R. The eyepiece units 104L and 104R respectively hold prisms 105L and 105R of a cubic optical system and a pair of left and right eyepiece optical systems 106L and 106R. Further, interlocking plates 107L and 107R are attached to the front ends of the eyepiece units 104L and 104R, respectively. Optical axes OL' and OR' of the eyepiece optical systems 106L and 106R are decentered from the optical axes OL and OR of the objective optical systems 101L and 101R by the prisms 105L and 105R, respectively. The eyepiece units 104L and 104R are attached to the base member 103 rotatably around the optical axes OL and OR. By operating and rotating the eyepiece units 104L and 104R, a distance (pupil or interpupillary distance) between the optical axes OL' and OR' can be adjusted. Herein, a direction orthogonal to the optical axes OL and OR illustrated in FIG. 3 and orthogonal to a straight line X-X passing through the optical axes OL and OR is defined as a pitch direction, and a direction parallel to the straight line X-X is defined as a yaw direction.

A image stabilization apparatus 108 includes an image stabilization base member 109, a pair of left and right image stabilization lenses (image stabilization optical systems) 110L and 110R, a movable member (holding member) 111, a pitch direction regulating member 112P, and a yaw direction regulating member 112Y. The image stabilization base member 109 is provided between the objective optical systems 101L and 101R and the eyepiece optical systems 106L and 106R in the optical axis direction, and holds a control board 113 mounted with an element for controlling the image stabilization apparatus 108. The movable member 111 holds the image stabilization lenses 110L and 110R, and is movable relative to the image stabilization base member 109. The image blurs can be corrected by moving the movable member 111 in the pitch direction and the yaw direction relative to the image stabilization base member 109. The pitch direction regulating member 112P and the yaw direction regulating member 112Y regulate the movements of the movable member 111 in the pitch direction and the yaw direction, respectively.

Drive coils 114P and 114Y are fixed onto the movable member 111. The image stabilization base member 109 has drive magnets 115P and 115Y and drive yokes 116P and 116Y for closing the magnetic flux generated by the drive magnets 115P and 115Y to form a magnetic circuit. The drive coils 114P and 114Y, the drive magnets 115P and 115Y, and the drive yokes 116P and 116Y form two actuators (a pitch actuator and a yaw actuator). These two actuators include first and second driving force generators for shifting the movable member 111 in a vertical direction (longitudinal direction, pitch direction) and a horizontal direction (lateral direction, yaw direction) in a plane orthogonal to the optical axis direction. The first driving force generator and the second driving force generator are not limited to this embodiment as long as one generates a longitudinal driving force and the other generates a lateral driving force.

The two drive coils 114P are disposed at a phase of the optical axes OL' and OR' with respect to the movable member 111 when viewed from the optical axis direction. The drive yoke 116P has a rear yoke part 116Pa disposed on the back of the drive magnet 115P, and an opposite yoke part 116Pb that forms an air layer for obtaining a driving force by the drive coil 114P. The drive magnet 115P and the drive yoke 116P are disposed opposite to the drive coil 114P.

The drive coil 114Y is disposed between the image stabilization lenses 110L and 110R. The drive magnet 115Y includes a first drive magnet (first magnet) 115Y1 opposite to the drive coil 114Y, and a second drive magnet (second magnet) opposite to the drive coil 114Y on the side opposite to the first drive magnets 115Y1. The drive magnet 115Y and the drive yoke 116Y are located opposite to each other and sandwich the drive coil 114Y in the optical axis direction. By providing the first drive magnet 115Y1 and the second drive magnet 115Y2 opposite to the drive coil 114Y, respectively, the driving force can be maintained with a single actuator even if the prior art provides two actuators.

A focus plate (focusing unit) 117 fixes the objective units 102L and 102R as a focus group. The focus plate 117 has a rack portion 118 engaged with a focus screw 119. An operation dial 120 is integrally fixed onto the focus screw 119. By rotating the operation dial 120, the focus plate 117 and the focus group moves back and forth in the optical axis direction so as to provide focusing.

This embodiment provides the yaw actuator between the image stabilization lenses 110L and 110R. Thereby, the image stabilization apparatus 108 can be made compact in the yaw direction. The two pitch actuators are provided between the straight line X-X (first line segment) connecting the optical axes OL and OR and the straight line (second line segment) connecting the optical axes OL' and OR'. Conventionally, two pitch actuators have been provided in a range where the eyepiece units 104L and 104R protrude from the objective units 102L and 102R viewed from the optical axis direction. Since the range that affects the external shape size of the image stabilization apparatus 108 can be limited, the image stabilization apparatus 108 can be made compact in the pitch direction. The binoculars 1 can be made compact by this configuration.

The eyepiece unit 104L (104R) may be provided around the objective unit 102L (102R). For example, the eyepiece units 104L and 104R may be provided such that the straight line passing through the optical axes OL' and OR' coincides with the straight line X-X passing through the optical axes OL and OR. In this case, the two pitch actuators may be provided on at least one of the straight line X-X passing through the optical axes OL and OR and the straight line passing through the optical axes OL' and OR'. Thus, the binoculars 1 can be made compact.

When the eyepiece units 104L and 104R are operated to adjust the interpupillary distance, this embodiment configures the two pitch actuators so that the eyepiece optical systems 106L and 106R are located at a phase decentered from the objective optical systems 101L and 101R. Thereby, the binoculars 1 can have a concave shape at the center, so that the user can hold the binoculars 1 by hooking his or her finger on the center, thereby improving the holding performance. In particular, the two pitch actuators may be located in this phase when the binoculars 1 are in the initial state (where the eyepiece units 104L and 104R are not operated). The initial state may be a state having a maximum, minimum, or predetermined interval between the optical axes OL' and OR'.

The pitch direction regulating member 112P has an opening 112Pa into which at least part of the drive magnet 115Y and the drive yoke 116Y is inserted. In other words, the at least part of the driving magnet 115Y and the driving yoke 116Y overlap the pitch direction regulating member 112P in a direction orthogonal to the optical axes OL and OR. Thereby, the image stabilization apparatus 108 can be prevented from increasing in size in the optical axis direction. The yaw direction regulating member 112Y may have the opening into which at least part of the drive magnet 115Y and the drive yoke 116Y is inserted.

The focus plate 117 is provided in a range connecting the two pitch actuators when viewed from a direction orthogonal to the optical axes OL and OR. Thereby, the projection of the focus plate 117 toward the external shape side can be reduced and the binoculars 1 can be formed to have a concave shape at the center, so that the holding performance can be improved.

This embodiment has described a case where the optical axes OL' and OR' are decentered in the pitch direction, but the decentering direction may be the yaw direction. When the decentering direction is the yaw direction, the actuator disposed between the image stabilization lenses 110L and 110R is used for the pitch actuator, and the actuator disposed in the decentering direction of the optical axes OL' and OR' is used for the yaw direction. In this case, in the pitch actuator, the drive magnet 115P has two drive magnets, and the two drive magnets are opposite to each other with respect to the drive coil 114P. The focus plate 117 is provided in a range connecting the two yaw actuators.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-099003, filed on May 28, 2019, which is hereby incorporated by reference herein in its entirety.

What is claimed is:

1. An optical apparatus comprising:
a pair of objective optical systems which light from an observed object enters;
a pair of eyepiece optical systems having optical axes decentered from optical axes of the pair of objective optical systems;
an image stabilization base member provided between the pair of objective optical systems and the pair of eyepiece optical systems;
a pair of image stabilization optical systems;
a movable member configured to hold the pair of image stabilization optical systems and to move relative to the image stabilization base member;
a pair of first driving force generators configured to generate a driving force to the movable member in a first direction orthogonal to the optical axes of the pair of objective optical systems; and
a single second driving force generator configured to generate a driving force to the movable member in a second direction orthogonal to the first direction and to the optical axes of the pair of objective optical systems, wherein at least a portion of the pair of first driving force generators are provided between a first plane including the optical axes of the pair of objective optical systems and a second plane including the optical axes of the pair of eyepiece optical systems, and wherein the single second driving force generator is provided between the pair of image stabilization optical systems.

2. The optical apparatus according to claim 1, further comprising:

a regulating member that regulates a movement of the movable member in a direction orthogonal to the optical axes of the pair of objective optical systems, wherein at least part of the second driving force generator overlaps with the regulating member in the direction orthogonal to the optical axes of the pair of objective optical systems.

3. The optical apparatus according to claim 1, wherein the pair of first driving force generators are configured to:

adjust an interval between the optical axes of the pair of eyepiece optical systems; and position the pair of eyepiece optical systems at a phase decentered from the pair of objective optical systems.

4. The optical apparatus according to claim 1, wherein the second direction is parallel to a line connecting the optical axes of the pair of objective optical systems.

5. The optical apparatus according to claim 1, wherein the second driving force generator includes:

at least one coil provided on the movable member;

a first magnet provided on the image stabilization base member and opposite to the coil; and a second magnet opposed to the coil on a side opposite to the first magnet.

6. The optical apparatus according to claim 1, further comprising:

a focusing unit configured to provide focusing by moving the pair of objective optical systems along the optical axes of the pair of objective optical systems, wherein the focusing unit is provided in a range connecting the pair of first driving force generators when viewed from a direction orthogonal to the optical axes of the pair of objective optical systems.

* * * * *